United States Patent [19]

Adams

[11] Patent Number: 4,817,088
[45] Date of Patent: Mar. 28, 1989

[54] COMMUNICATIONS NETWORK

[75] Inventor: John L. Adams, Leiston, England

[73] Assignee: British Telecommunications plc, London, England

[21] Appl. No.: 80,672

[22] PCT Filed: Oct. 17, 1986

[86] PCT No.: PCT/GB86/00638
§ 371 Date: Jun. 17, 1987
§ 102(e) Date: Jun. 17, 1987

[87] PCT Pub. No.: WO87/02535
PCT Pub. Date: Apr. 23, 1987

[30] Foreign Application Priority Data

Oct. 17, 1985 [GB] United Kingdom ............. 8525591

[51] Int. Cl.[4] .................................................. H04J 3/16
[52] U.S. Cl. ........................................ 370/88; 370/89; 370/94
[58] Field of Search ............... 370/88, 85, 94, 89; 340/825.05, 825.5

[56] References Cited

U.S. PATENT DOCUMENTS

| | | | |
|---|---|---|---|
| 4,516,121 | 5/1985 | Moriyama et al. | 340/825.05 |
| 4,538,147 | 8/1985 | Grow | 340/825.05 |
| 4,542,502 | 9/1985 | Levinson et al. | 370/88 |
| 4,575,843 | 3/1986 | David et al. | 370/88 |
| 4,609,920 | 9/1986 | Segarra | 340/825.05 |
| 4,692,918 | 9/1987 | Elliott et al. | 370/85 |
| 4,696,001 | 9/1987 | Gagliardi et al. | 370/88 |

FOREIGN PATENT DOCUMENTS 0089159 9/1983 European Pat. Off. .
0168265 1/1986 European Pat. Off. .

OTHER PUBLICATIONS

Proceedings of the International Switching Symposium, 7-11, May 1984, Session 42B, paper 2, Florence (IT) C. Fruchard et al.: "A Hybrid Switched Open Network for Voice and Data Services", pp. 1-7.
Commutation & Transmission, No. 1, vol. 6, Mar. 1984, Issy-les-Moulineaux (FR) R. Renoulin et al.: "Les Reseaux Multiservices d'entreprise Carthage et LCT 6500" pp. 49-60.
Proceedings of the International Switching Symposium, 7-11 May 1984, Session 42B, paper 3, Florence (IT) T. Takeuchi et al.: "Synchronous Composite Peaket Switching for ISDN Switching System Architecture": pp. 1-6.
IEEE Global Telecommunications Conference, 20 Nov.-Dec. 1983, paper 11.1, San Diego (US) J. Mark: "Integrated Voice/Data Services on a Dual Ring Local Area Network", pp. 1-5.
Proceedings of the 25th IEEE Computer Society International Conference, Compcon, 20-23 Sept. 1982, Washington (US) M. Marsan,: "Multi-channel Local Area Networks", pp. 493-502.
IEEE Transactions on Power Apparatus and Systems, vol. PAS-102, No. 1, Jan. 1983, New York (US) D. Damsker,: "Totally Distributed, Redundantly Structured Hardware and Software Local Computer Control Network":, pp. 127-133.

Primary Examiner—Douglas W. Olms
Assistant Examiner—Min Jung
Attorney, Agent, or Firm—Nixon & Vandehye

[57] ABSTRACT

A communication network comprises a number of slotted rings which interconnect nodes so that information is carried between nodes in the form of slot sized packets on each ring. Each node includes controller for controlling the maximum acces delay experienced by packets belonging to the synchronous services, and selector for allowing any synchronous connection to utilize the first available ring for transmission of packets.

26 Claims, 7 Drawing Sheets

COMMUNICATIONS NETWORK

FIELD OF THE INVENTION

The present invention relates to a communications network. In particular the invention relates to a type of communication network comprising a plurality of nodes connected by a transmission ring wherein information is transferred between the nodes by transmission around the ring.

BACKGROUND AND SUMMARY OF THE INVENTION

Communication networks of this type are known which may form a local area network or a wide area network. Early systems were designed to operate at one to ten megabits per second and more recently higher transmission speeds have been achieved using established protocols based on token passing or slotted rings. An example of a slotted ring protocol is described in an article titled "The Cambridge digital communication ring" by M W Wilkes and D J Wheeler for "Proceedings of the local area communications network symposium" in 1979. These known systems may provide a transmission rate up to about one hundred forty megabits per second.

A problem with known communication systems of the aforementioned type is that a higher transmission rate is often required. Examples of applications requiring a high transmission rate are speech, video transmission and mixed traffic applications. In proceedings of the International Switching Symposium May 1984, a paper by Takeuchi et al suggests the use of synchronous composite packet switching where nodes have unlimited access to a number of rings. A problem with this proposal is that the synchronous connections must have packets regularly at very short time intervals (every 125 microseconds). This restriction only allows composite packet voice to be handled. Further since a slot is continually re-used by a synchronous connection, this slot is effectively reserved so that if a ring failure occurs then synchronous connections using that ring are lost.

It is an object of the present invention to provide a network capable of operating at high speed without restrictions of the type mentioned above.

According to the present invention there is provided a communication network suitable for the transmission of synchronous services such as voice, and also data packets, comprising:

a plurality of nodes (13) each connected to at lesat two rings (11', 11") to allow transmission to occur in one direction around each ring, characterised by:

control means (27) for controlling the maximum access delay experienced by packets belonging to the synchronous services and selector means (17, 19) for allowing any synchronous connection to utilise the first available ring for the transmission of each of its packets.

Preferably information is transferred in packets which are transmitted within predetermined time slots wherein each packet has a predetermined number of digits. To ensure that a node does not attempt to initiate simultaneous transfer of two packets the time slots for each of the physical links may be relatively out of phase. However it is advantageous that once a phase relationship between the links has been provided this does not shift, therefore, in a preferred embodiment all the data links are substantially the same length and introduce substantially equal delays and a common clock may provide timing signals for all of the data links.

Further according to the invention there is provided a method of operating a communication network comprising a number of stations connected to a plurality of message rings said method characterised by:

allocating a number of message slots to each station dependent on traffic requirements to ensure delay sensitive messages are transmitted without undue delay; routing the passage of message blocks at any station to an available ring for transmission to a downstream station and interrogating each available ring to determine whether a further allocation can be provided.

In the embodiments of the invention to be described the network operates according to a protocol described in the present applicants European Patent Application No. 85305017.7 (now published as EP No. 0168265 and incorporated herein by reference) and in an article by R M Falconer and J L Adams entitled "Carrying Integrated Services on the Orwell slotted ring" for "Proceedings of the International Seminar on Computer Networking and Performance Evaluation", Tokoy, 1985. See also 'Orwell: a protocol for integrated services local network' by R M Falconer and J L Adams, British Telecom Technology Journal Vol 3 No 4 October 1985. Therefore in a preferred embodiment a transmit node is prevented from transmitting more than a predetermined number of packets during a predetermined interval.

BRIEF DESCRIPTION OF THE DRAWINGS

Preferred embodiments of the invention will now be described, by way of example, with reference to the accompanying diagrammatic drawings, in which.

DETAILED DESCRIPTION

Figure 1:
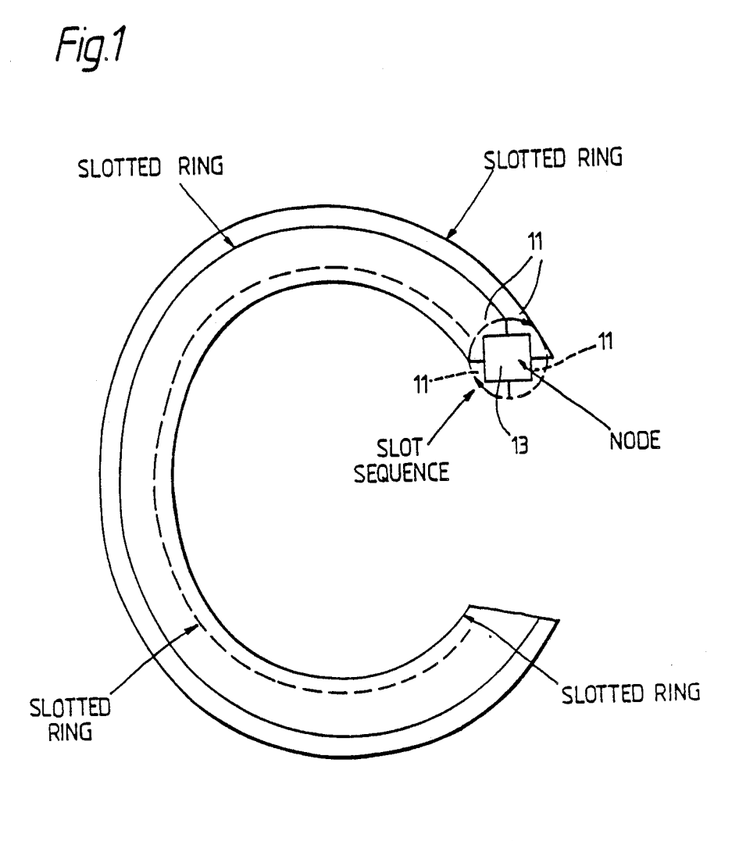
FIG. 1 is a partial view of a netework according to an embodiment of the invention, incorporating four rigs.

Referring to FIG. 1, this shows a network comprising a series of four parallel rings 11 and a number of nodes 13 (only one of which is shown in the Figure) interconnected by the rings. Note that each node has access to all of the rings (as described in more detail below). The rings are slotted rings and operate according to the protocol described in the documents mentioned above, which will be referred to as the "Orwell" protocol.

The differences between the single-ring system described and illustrated in the documents just mentioned, and the set of rings described here will be explained below.

All of the rings 11 have the same channel rate, which in this example is 140 Mbit/sec. The channel rate is maintained by a master clock (not shown) for all four rings. Also, the rings all have the same propagation length. Each ring is buffered with an elastic buffer to control the propagation length to a constant number of bits which is fixed for all the rings. Each ring carries the same number of slots of equal length, but the slot boundaries on one ring are displaced relative to all of the others so that two slots never arrive at a node simultaneously. For example, as there are four rings and if each slot is 160 bits long, each slot boundary may be displaced from those on adjacent rings by 40 bits so that the first bit of a slot on one ring will arrive at any node 40 bits behind a slot on an adjacent ring and 40 bits ahead of a slot on another adjacent ring. All of the rings have a frame alignment field which defines for the ring the start of a sequence of slots.

Figure 2:
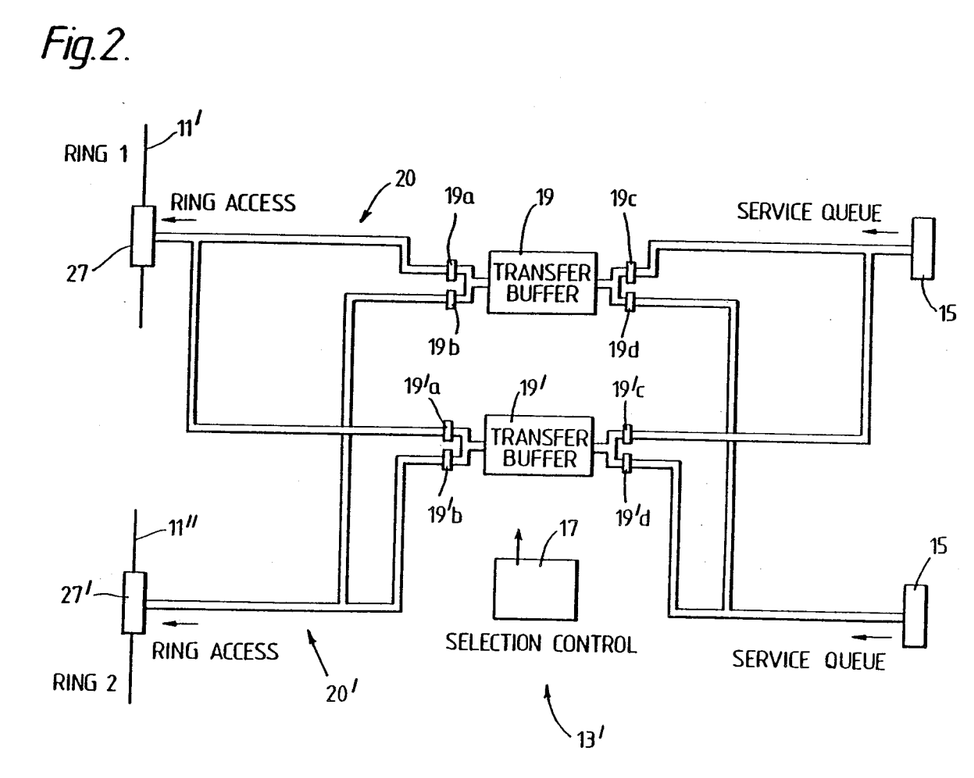
FIG. 2 shows the access control for a node associated with two rings.

Referring now to FIG. 2, this shows some details of a node 13' interconnected with two parallel rings 11' and 11''. Although FIG. 2 illustrates a two ring system and FIG. 1 a four ring system, the two are very similar, but the two ring example is adopted for FIG. 2 for purposes of simplicity.

Node 13' is typical of all nodes in the system. The node operates in a similar manner to nodes on the single ring system described in the documents referred to above and includes additional components so that each packet is available to fill an empty slot on both of the two rings 11' and 11''.

Node 13' has a number of service queues 15 of waiting packets, and a sequence of packets is realised by select logic 17 as in nodes in the single ring system. Each packet released from a queue is stored in one of two FIFO (first-in first-out) buffers 19, 19'. The buffers 19, 19' have associated latches 19a–19d and 19'a–19'd respectively. Each of the buffers has a bus system to deliver the octets of the packets to either ring. Node 13' also includes sub-nodes 20, 20' which comprise access controllers 27, 27' for controlling access to each ring according to the 'Orwell' protocol. Each of the sub-nodes has a coutner which holds the number (d) allocated to node 13', which is the maximum number of packets the node is allowed to transmit between resets of the counters. Since packets can be transmitted onto two rings 11' and 11'', the counters in both sub-nodes 20, 20' must be decremented each time a packet is released onto either ring. An interconnecting control line (not shown) is provided so that both counters are decremented when a packet is sent onto a ring.

The system operates so that an empty slot on either ring is made available to any node which is not inhibited from transmitting (ie which is not in a 'pause' state, after using up its allocation of 'd' packets). Trialling prior to resetting occurs using the 'Orwell' rules whenever any node is idle or in a 'pause' state, and trials can occur on both rings simultaneously.

When a node issues a reset slot, a control indication must be sent to other rings to temporarily inhibit further trial slots from being turned into reset slots. This ensures that the frequency of resets on the Torus reflects the true unused capacity, ie it is not distorted by the presence of 'ghost' resets. Such a 'ghost' reset would occur if a node issued a reset slot when there is already one on the ring from another node. Therefore, a node which issues a reset slot enters the OUTSTANDING RESET state. During this state, successful trial slots and reset slots on any ring are handled according to the OUTSTANDING RESET condition as described for example in our pending European Patent Application No. 85305017.7 and our UK Patent Application No. 8618118.

Whenever a reset slot is received by a node, the access logic must cause a control pulse to be issued to the central LOAD MONITOR which measures the Torus reset frequency. At the same time this control pulse clears the OUTSTANDING RESET condition, should the node be in this state. Since resetting and trialling can occur on both rings, the rate of resets is likely to be much higher than for a single ring system; the capacity of the full system is simply the sum of the capacities of the individual rings. As in the single ring system, the rate of resets is a guide to the load on the system. It is also used by the SELECTION LOGIC to control the mix of packets being transferred from the different service queues (see FIG. 2) to the PACKET TRANSFER BUFFERS, as described in the next section.

The operation of the two ring system of FIG. 2 will now be described in more detail. Suppose that buffer 19 is empty and packets are waiting in queues 15. A packet is selected by the select logic 17 and delivered to the buffer 19 which can accommodate a single slot-sized packet (160 bits in this example).

The rate at which packets are transferred from a queue is controlled via the selection logic. Essentially, each queue has an assigned maximum number of packets which may be transitted between successive resets of the Torus. Packets may be selected from a queue provided is has not already used up its maximum allocation. In the event of there being two or more queues which have not used up their respective allocations, and where each queue has a packet waiting, then selection proceeds by choosing the waiting packet from the most delay critical service queue.

The packet remains in buffer 19 until an empty slot arrives on one of the two rings, this event being detected by access controllers 27,27'. If a packet had been waiting longer in buffer 19' then this packet would be selected for transmission and the packet in buffer 19 would have to wait for another empty slot. Having found an empty slot, access controller 27 or 27' provides a control indication (not shown) to enable buffer 19 to transfer its octets to the appropriate ring. For this purpose the control indication for 27 or 27' is provided via selection control which is responsible for selecting the longest waiting packet and ensuring that this is transferred on the correct bus, towards either 27 or 27'.

Figure 3:
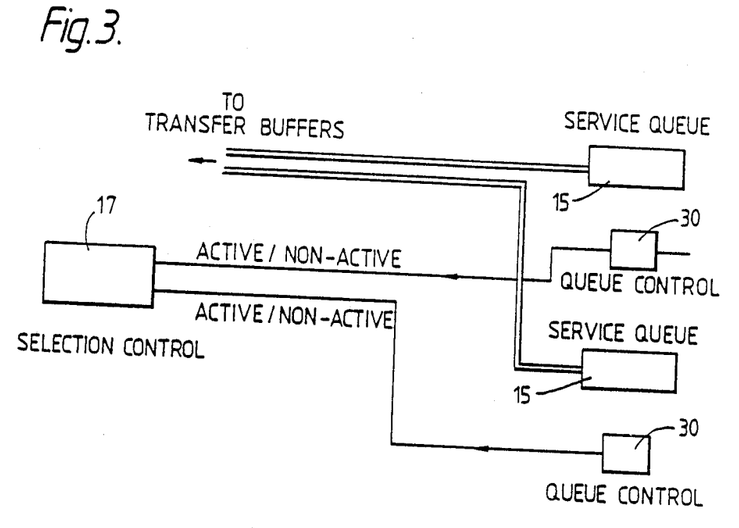
FIG. 3 shows the packet selection control.

Referring to FIG. 3, the selection of packets from the service queues will now be described in more detail.

Associated with each queue is some control logic 30 which returns an ACTIVE state of that queue to the selection control logic 17 provided:

(1) A packet is waiting in the FIFO for that queue and
(2) The queue allocation is not used up.

The next packet to be transferred to the PACKET TRANSFER BUFFERS is selected simply by choosing the highest priority ACTIVE queue.

Each queue control has a counter which is loaded with the maximum allocation on every reset received from the LOAD MONITOR (which may or may not be at the same rate as the Torus reset rate, as discussed below). Every time a packet is selected from the queue the counter is decremented. If the counter reaches zero the queue cannot enter the ACTIVE state until the next reset.

Thus the queue control operates on a number of input control signals, namely:

(a) the allocation reset signal as already described
(b) the transfer request signal which initiates transfer by the queue contnrol logic of a packet from its queue to a PACKET TRANSFER BUFFER
(c) the overload signal which is sent via the LOAD MONITOR to reduce the allocation of bandwidth on variable bit rate queues when overload conditions are approaching on the Torus. On receipt of this signal (constant bit rate queues are not connected to receive this signal) the allocation remaining in the counter is set equal to zero.

(d) a data/control bus to a processor (not shown) supporting call control functions via which bus the queue allocation may be updated.

An algorithm by which the LOAD MONITOR may adjust the rate at which it sends overload signals to the rate of receiving resets from the Torus is now described.

OVERLOAD CONTROL

1. Masked Resets

If substantial amounts of variable bit rate video are to be carried, the approach of giving this type of queue a small fixed allocation in each reset interval is not adequate. Thus the idea of the BACKGROUND allocation, described in our aforementioned patent application, was to provide each node with a small 'd' value which could be used by data services. The data load is highly variable in its nature. However, when the reset rate of the ring is high, the data service can utilise a large amount of the ring bandwidth. On the other hand, if the reset rate drops to its minimum value, the data service can only obtain a much smaller allocation obtained by making its 'd' value deliberately small.

The BACKGROUND concept provides a load control mechanism whereby the carried data load is reduced in the event of an overload. This approach to handling overloads seems appropriate to be extended also to variable bit rate video. However, it would not be correct to assign a small fixed allocation to this queue. If there was only a fixed allocation available then a node with a large amount of connections established may receive only as much ring bandwidth as another node with a much smaller number of established connections.

The best method of adjusting the 'd' allocation of the variable bit rate video queue is to assign a 'd' value which is equal to half the peak number of packets arriving every 125 microseconds. This value allows each connection to obtain the peak bandwidth or any smaller allocation provided the Jorus rest rate is at least 2 resets every 125 microseconds. Such a reset rate on the Torus corresponds to the point where it is approaching full load. Hence the value chosen to adjust 'd' implies that the dynamic range of load which can be accepted from each connection remains high without requiring that the Torus capacity is utilised inefficiently. However such a value requires that additional mechanisms exist for removing overloads. Additional load control mechanisms are necessary anyway, eg to cope with a sudden ring failure on one of the rings of the Torus.

This additional control is achieved via the concept of the MASKED RESET. Instead of relying on the queues having a small 'd' value to reduce the carried load, the MASKED RESET concept reduces the number of times the variable bit rate queue is reset to receive its current (possibly large) allocation. Thus some of the resets arriving on the node from the Torus are masked off (ie are not supplied to the variable bit rate queue) in the event of an overload. A method is now described whereby the rate at which resets are masked is adjusted to the rate of receiving resets from the Torus.

The principle underlying the method is that, until the reset rate drops to a certain value of 'r' resets per 125 microseconds, no resets are masked from the variable bit rate queue. Below this rate, resets are masked at a rate which is adjusted to the Torus rate. The maximum rate at which resets are masked occurs when the Torus only achieves 1 reset per 125 microseconds.

To achieve this, each node uses two counters called $C_a$ and $C_b$. At the beginning of every 500 microsecond period, counter $C_a$ is loaded with a fixed value, eg $C_a=8$. On each reset received from the ring $C_a$ is decremented. Then, at the end of 500 microseconds the number remaining in $C_a$ is transferred to $C_b$. While the number in $C_b$ remains positive, resets will be masked from the variable bit rate queue in the next 500 microsecond period (except for the first reset). Every time a reset is masked, a fixed value is subtracted from $C_b$ (in the case where $C_a=8$ the fixed value to be subtracted from $C_b$ is 1).

For any given choice of 'r', ie the rate below which masking commences, the following example shows that the appropriate initial value to load in $C_a$ is $4r$ and the fixed value to be subtracted from $C_b$ on each masked reset is $r-$. Thus, choosing $r=2$, $C_a$ is loaded with the value $4r$, ie 8. Suppose there are 8 resets in the next 500 microseconds (equivalent to 2 resets every 125 microseconds). Then at the end of 500 microseconds the value loaded in $C_b$ will be zero, ie no masking will occur as required. On the other hand, suppose only 4 resets occur in 500 microseconds (equivalent to the minimum acceptable rate of 1 reset every 125 microseconds). Then the value transferred to $C_b$ is 4, so 4 resets will be masked (excluding the first) in the next 500 microseconds which is the maximum number which can be masked.

A reset need not be masked on all nodes if the 500 microsecond clock period starts and ends at a different point on each node. Thus, dividing the timing interval into four 125 microsecond clock periods, each node can be placed into one of four different phases. To initialise the system, the first reset pulse received from a ring after initialisation can act to synchronise timing on all nodes.

The use of this phasing technique smooths the load on the Torus. This is further enhanced by sending an OVERLOAD signal to each variable bit rate queue whenever a reset would normally be sent but, instead, must be masked from the queue. The OVERLOAD signal ensures that any residual unused allocation from a previous reset is deleted from the variable bit rate queue. Thus the only nodes which can transmit packets from the variable bit rate queue are those which designated the latest reset to be unmasked.

The effect of this method is that, taking a snapshot of the system when the Torus rest rate is below 'r' resets per 125 microseconds, only certain nodes will be seen to have re-activated the allocation on their variable bit rate queue. After each reset this group of nodes changes. The size of the group at any one stage depends on the Torus reset rate. It drops to a size of 25% of the total number of nodes when the reset rate is reduced to 1 every 125 microseconds. This implies that the Torus may reduce the carried load from the variable bit rate queues by approximately 75% as the system approaches overload.

2. Auto-Resets

If a node experiences no reset within a certain interval T then it automatically resets its own 'd' allocations without requiring a reset slot to be received from the Torus. The node makes no attempt to reset other nodes. Instead these are relied upon to reset themselves when their own timeouts expire.

To ensure that the auto-reset does not make the apparent unused capacity of the Torus appear higher, these resets are not counted by the LOAD MONITOR and do not decrement counters Ca or Cb. They are passed on to all constant bit rate queues to update the queue allocations, and to all variable bit rate queues if Cb is zero. Otherwise an overload pulse is supplied to the variable bit rate queues. A further requirement is that the auto-reset does not adjust the TYPE flag (as described in our aforementioned patent application) of a node in order to ensure that, 'ghost' reset slots are not created.

It is proposed that the timeout interval T is set to 125 microseconds. This implies that every node will be guaranteed to be reset at least once every 125 microseconds. This protects constant bit rate connections in the event of two important cases; firstly, if a reset slot becomes corrupted and fails to reset all nodes; secondly, a large surge in the variable bit rate load occurs.

Expanding on the latter point, suppose the load from the variable bit rate connections suddenly increases by a large amount. Although each connection only has an allocation equivalent to half the peak rate there may still be a substantial number of extra packets to be carried. The effect of this is to lengthen the interval between resets. If this continues for at least 500 microseconds then the masked reset principle mentioned above will damp down the overload. In the meantime, before the mask mechanism has time to react, the auto-reset mechanism will ensure that nodes continue to experience the required minimum reset rate.

After each reset, packet selection will proceed by taking waiting packets from the constant bit rate queues in preference to the variable bit rate queues so that their service is maintained.

Subsequent resets, following the initial load increase are also likely to be auto-resets. However it will be noted that, because counter Ca is not decremented by an auto-reset, the mask mechanism will adjust quickly to damp down the overload. Meanwhile service is maintained for the constant bit rate queues. The combination of auto-resets and masking is thought to be able to absorb substantial impulsive changes in the load from variable bit rate connections.

These control signals have to be distributed to all queue boards from the PACKET TRANSFER BUFFER selection logic and from the LOAD MONITOR. Furthermore, to ensure that resets are not received on the variable bit rate queues while an overload condition persists, two supplies of reset signals are provided by the LOAD MONITOR. the first supply is connected to all constant bit rate queues and the rate of issuing resets equals the rate received from the Torus. The second supply provides a reduced rate of resets to the variable bit rate queues. This has been termed the MASKED RESET SUPPLY.

Queue Reset Actions for Voice Packets

For services where the bit rate is lower than 1 Mbit/s, a queue allocation of one packet per reset interval is shaped by several connections since this minimum allocation represents 1 Mbit/s. For 64 kbit/s voice up to 16 connections can share this allocation.

Even for a fixed number of calls in progress, an important characteristic displayed by voice packets is that there is a constant load in each successive 2 millisecond period (ie the period corresponding to the packet assembly time) but the load may be highly variable over shorter intervals (especially the time corresponding to the maximum allowable reset interval, ie 125 microseconds). In the worst case, packet assembly is completed at the same time on all connections, leading to a large demand for Torus capacity at a specific point in each 2 millisecond period.

Consider the case where 17 voice connections are to be established. The simplest procedure would be to provide the queue with a maximum allocation of two packets per reset interval. This gives the queue a greater allocation than it requires which enables it to distribute the load unevenly among successive reset intervals. Thus, if the combined voice packet load over all nodes arrives in a very uneven way, the net effect of the excess allocation on each queue is to make some reset intervals of the Torus longer than others. The effect is greater where there are a large number of nodes. To avoid experiencing some unacceptably long reset intervals during times of peak load on the Torus, the allocation given to these queues must closely match their current requirements.

This is achieved within the queue control logic associated with each queue. Thus, if there are 'n' calls in progress and 'm' is the integer part of n/16 then, in successive resets of the queue, the control logic loads the maximum allocation counter with the value m for a fixed number of times and with the value m+1 for a further fixed number of times. It follows that the bandwidth allocation is sufficient if the value m+1 is chosen for the first n-16m times and the value m is chosen for the remainder of the time in every 16 resets.

Figure 4:
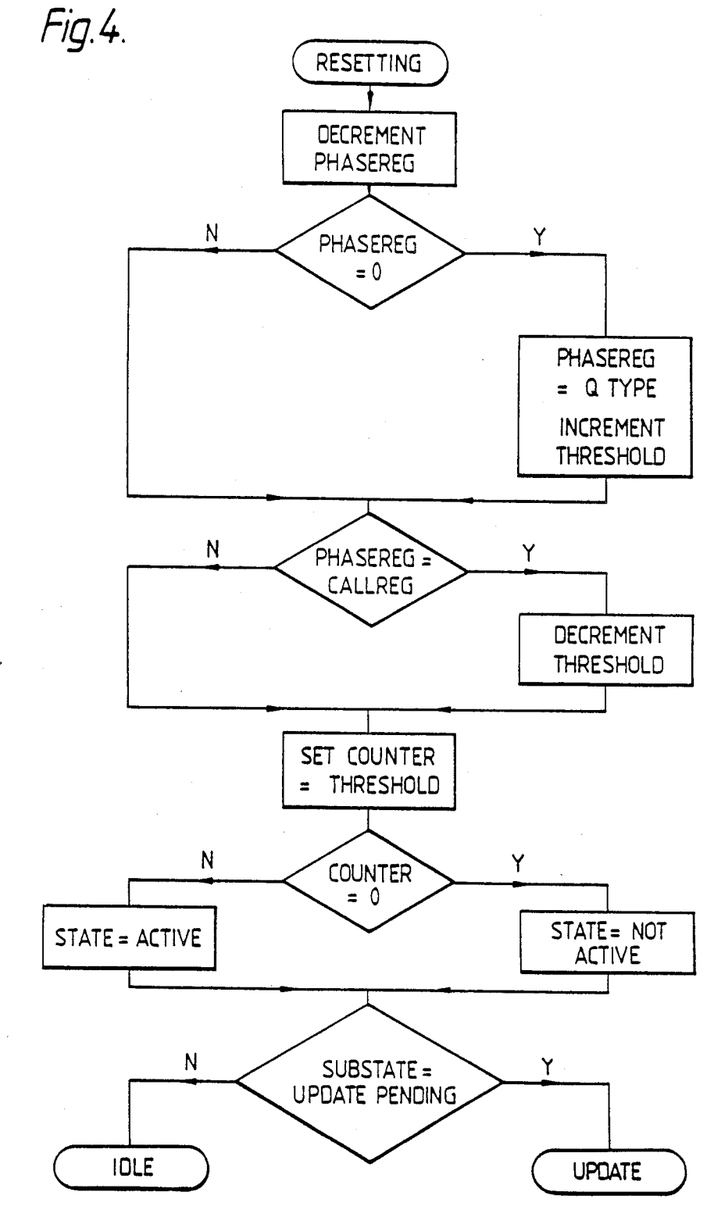
FIG. 4 shows a flowchart of the queue control reset actions.
Figure 5:
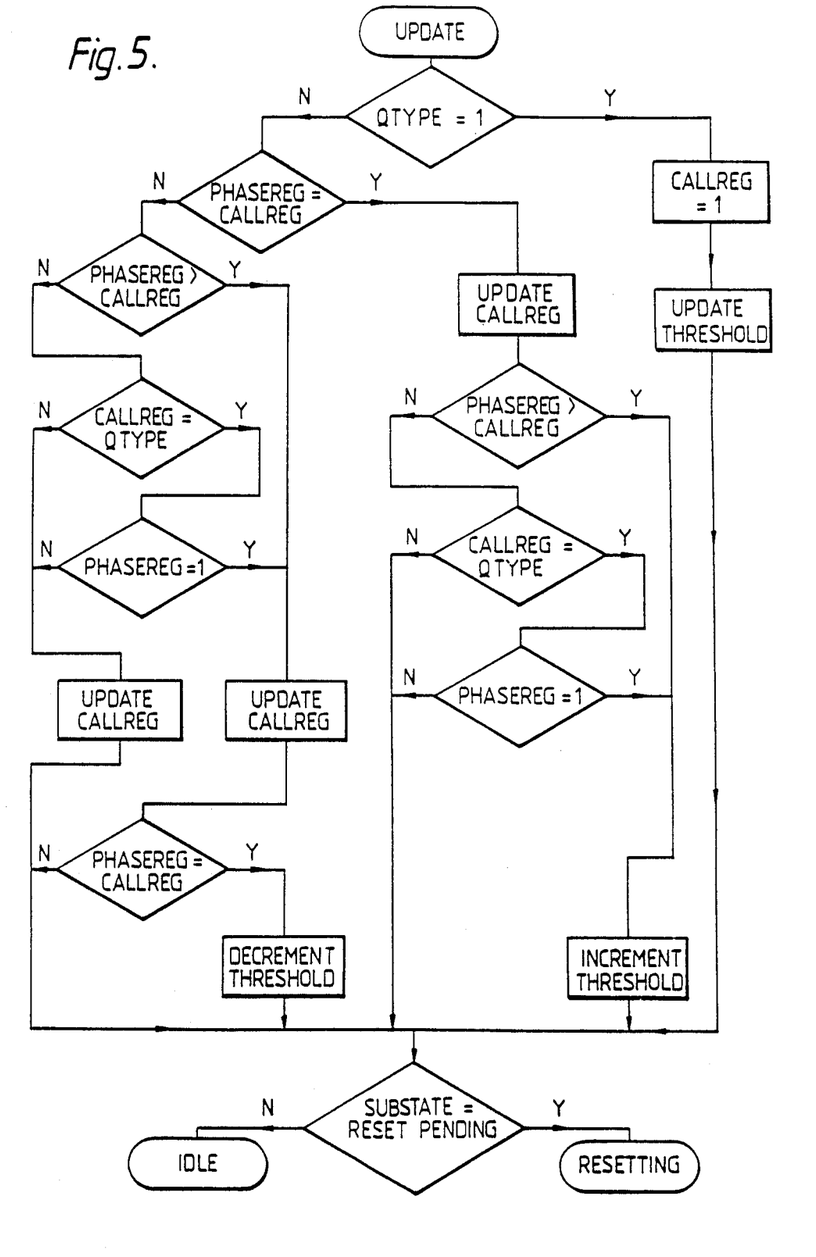
FIG. 5 shows a queue control allocation update flowchart.

FIG. 4 and 5 summarize the control actions taken to update the queue bandwidth on receipt of a reset pulse. The integer CALLREG which appears in this figure is used to derive the value of n-16m and hence determines the number of times the allocation m+1 is chosen. CALLREG has the initial value of 16 and is decremented on each call arrival via a control line from a processor (not shown) supporting call control functions. On reaching zero its value returns to 16 again. Similarly, the value of CALLREG is incremented on each call cessation. On reaching the value 17 its value is made equal to 1. The integer PHASEREG counts successive resets in cycles of 16. Thus, PHASEREG is decremented after every allocation of m+1 is given while PHASEREG is greater than CALLREG. By initialising the PHASEREG with a different value on each node the load on the Torus is kept as even as possible in successive reset intervals.

Other constant bit rate services with bit rates of 128 kbits/s, 192 kbit/s, etc., may share the same queue. In this case the addition of a new call causes CALLREG to be decremented 'r' times a service whose bit rate is r x 64 kbit/s. Where the service bit rate is not an integer multiple of 64 kbit/s the value of 'r' should be chosen to be the nearest integer multiple above the actual bit rate of that service. Furthermore, by using the integer QTYPE set to either the value 16 or the value 1, the same queue control logic can be used for any type of queue. Thus, when QTYPE equals 1 the maximum allocation counter is set to the same value on every reset, corresponding to normal operation. When QTYPE equals 16 the allocation varies as described above.

Constant bit rate services whose bit rate exceeds 1 Mbit/s may also use the above method of smoothing the load on the Torus, especially when their bit rates are not integer multiples of 1 Mbit/s. However, this packet load should not be mixed with the voice packets because of the uneven nature of the load arising from the latter source. Such a mixture may allow a large number of voice packets to take all the queue allocation, so causing unacceptable delays to the other services. It should also be noted that the addition of a new call of, say, 2.128 Mbit/s requires 'm' to be incremented by 2 (corresponding to 2 Mbit/s) as well as CALLREG to be decremented twice (corersponding to 128 kbit/s). This is an extension of the method of adjusting the queue allocation described above where all services were under 1 Mbit/s.

Figure 6:
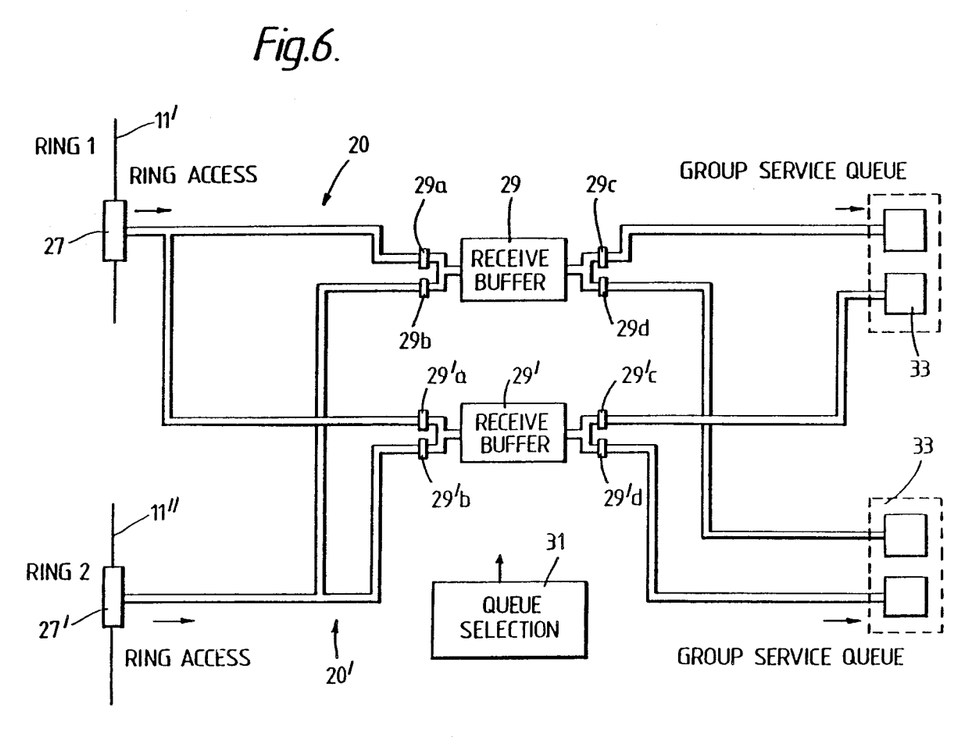
FIG. 6 shows the packet reception configuration.

Referring now to FIG. 6, packets addressed to node 13' are detached by the access controller on the appropriate ring, say ring 11', and the packet is delivered by controller 27 to a FIFO receive buffer 29 (with associated latches 29a-d) via sub-node 20. To ensure that packets do not get out of sequence the RECEIVE BUFFERS are filled in cyclical order and their contents are read out in the same order. It is a further requirement that there are at least as many RECEIVE BUFFERS as there are rings on the Tortus. This is to ensure that each node may accept packets at the maximum rate at which full slots can arrive from the Torus.

The queue selection control unit 31 associated with the RECEIVE BUFFERS must ensure that the next incoming packet from any ring is directed to the correct RECEIVE BUFFER. It is also important that any RECEIVE BUFFER quickly delivers its packet to one of the GROUP SERVICE QUEUES, so it can receive a further packet after an interval equivalent to the length of a slot on each ring. Queue selector 31 determines which of the service queues 33 receive the packets. This requirement enables the node to keep up with a sustained high arrival rate from the Torus. If any one GROUP SERVICE QUEUE cannot keep up with this rate then additional buffering must be made available there to prevent packet loss.

Figure 7:
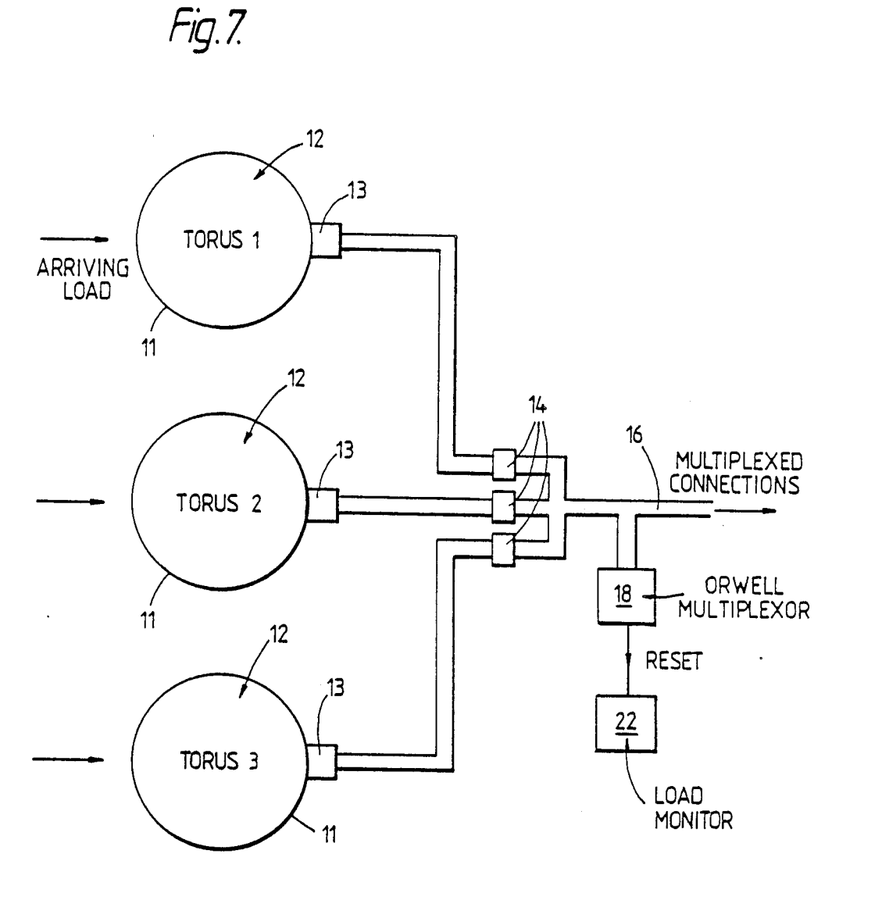
FIG. 7 is a view of three interconnected ring systems.

As shown in FIG. 7, each RECEIVE BUFFER is connected to a bus system through which the packet may be delivered to any GROUP SERVICE QUEUE. The selection of a particular queue is achieved by analysing the packet header to identify the packet TYPE, as described in our aforementioned patent application, including PRIORITY and ASYNCHRONOUS/SYNCHRONOUS indications. Selection also uses the destination address field to differentiate between packets destined for the node as opposed to packets which have been taken off by the node for onward routing to another ring.

Note that all notes are able to transmit and receive packets from all rings on the system. Thus an empty slot on any ring can be made available to any node. Although the above examples were four and two ring systems, it will be appreciated that there may be any convenient number of rings. It is convenient to envisage the rings as being parallel to one another as indicated in FIG. 1. To operate as described above, all of the rings must have the same channel rate (ie speed).

The staggering of slots as described above is desirable, because no two slots ever arrive at any node simultaneously.

As mentioned above, all rings have the same propagation length (ie the same number of bits) overall. However, it is unnecessary for the cable length between two adjacent nodes to be the same, provided the cable lengths differ by fewer bits than the minimum displacement between slot boundaries. The slots will therefore remain out of alignment and the protocol can operate as described, without the need to include contention logic.

It has also been stated that the ring system has a master clock which synchronises all the rings. It is important that the clock rate is the same for all the rings, but the synchronising pulses transmitted to each ring need not be in phase.

The system described above has a number of advantages. First of all, it is capable of operating at high speeds, typically at speeds in excess of 1 Gbit/sec. 140 Mbit/sec rings are currently feasible and n parallel rings can operate at n times that rate. From the point of view of the nodes, the system appears as a single high speed ring. Each ring, however, operates at a lower speed. Since all rings are reset simultaneously, the rate of resets provides information on the total load on the system and this can be used in deciding whether to accept new calls. Another advantage is that each of the rings is to a large extent independent, and rings can be added to or removed from the system without isolating the nodes. Should a ring fail, then throughput is correspondingly reduced, but the remainder of the system would survive intact. A certain amount of redundancy may be built-in so that satisfactory levels of service are maintained even if a ring does fail (eg through failure of a sub-node or node access controller on one ring).

A new node may be added to the Torus without causing the loss of more than 1/R of its switching capacity, where R is the number of rings of the Torus. The principle is that a single ring of the Torus is first disconnected and the new node is connected at that point. Meanwhile, the remaining rings are available to support existing connections. Having re-intialised this ring, with its new node, its capacity becomes available once again for switching purposes. The process is now repeated on the next ring, and so on.

It is anticipated that either this procedure is done during periods of low traffic (eg at night time when the load is below its peak), or else that the Torus is deliberately over-provided with one extra ring so that the reduced capacity is adequate at all times.

A problem which arises with this method is that, when the new code is added to a ring, the total delay round that ring is increased unless compensated by an elastic buffer. If the ring delay is increased then the pattern of slot arrivals at a node is disturbed with the possibility that two slots will arrive at a node simultaneously. If this occurs the ring-to-ring control logic would not have sufficient time to operate as described in section 4 and mis-operation of the protocol would result.

To avoid this the simplest solution would be to have an elastic buffer on each ring which could compensate for the additional delay produced by the new node. This means setting up the elastic buffers in advance with extra delay which can then be removed when new nodes are added. For example, if a new node adds an extra 40 bits of delay then a 50-node ring gives rise to 2000 bits delay plus a small amount of delay due to the length of the ring. Thus, if the initial configuration of the Torus has, say, 30 nodes and elastic buffers which bring each ring up to a total delay of about 2000 bits, then an extra 20 nodes could be added later.

During re-initialisation of a ring the new node must be allocated a value in the PHASEREG (as discussed above), and the subsequent decrementing of the PHASEREG counters must begin on all nodes at the same time. To control this, the first reset of a re-initialised ring acts to synchronise the beginning of decrementing the PHASEREG (ie resets on all other rings have no effect on PHASEREG until the first reset of the re-initialised ring is received). Clearly this action need only be performed on one ring (eg the first ring to be connected to the new node). For subsequent ring initialisations the actions of re-initialising the PHASEREG counters will be inhibited.

Each node may have fewer buffers (19, 19') which are provided with packets from the service queues (15) than there are rings. This is because, particularly for systems having three or more rings, it is unlikely that all the buffers are involved in delivering packets into empty slots on each one of the rings at the same time.

The system described allows the carrying of dedicated voice packets to be one of services available to the user, in addition to handling data packets.

As shown in FIG. 7, systems of parallel rings may be interconnected. FIG. 7 shows three ring systems 12 each comprising a stack of parallel rings 11 with nodes 13. Each system 12 has a bus leading to a block 14 comprising individual queues for the various services on the rings (eg voice and data queues), which deliver packets onto a multiplexor link 16 under control of a multiplexor 18.

The interconnected stacked ring system illustrated can provide a switch with low blocking, or which is completely non-blocking provided the bus connecting the rings to link multiplexor 18 can operate at a sufficiently high speed. A load monitor 22 is provided so that calls can be accepted unless the route for the call is already completely full. This provides a high speed system at relatively low cost where all possible outlets are available to each ring. The system can be expanded easily.

I claim:

1. A communications network suitable for the transmission of synchronous services such as voice, and also data packets, comprising:
    a plurality of nodes each connected to at least two rings to allow transmission to occur in the same direction around each ring, characterized by:
    control means for controlling the maximum access delay experienced by packets belonging to the synchronous services and selector means for allowing any synchronous connection to utilize the first available ring for the transmission of each of its packets, the control means being configured to control the number of packets (d) which can be allocated for transmission from any node without inhibition, to any of the rings to which it is connected.

2. A network as claimed in claim 1 characterized in that the control means includes a reallocation device at each node for independently seeking reallocation to all nodes of the right to transmit a number of packets.

3. A network as claimed in claim 1 further including means for insuring that packets transmitted on different rings are received in the same order as that of the transmitted sequence.

4. A network as claimed in claim 3 wherein the means for insuring includes a master clock configuration with staggered time slots relative to the rings to maintain sufficiently well defined and unambiguous time order for the slots.

5. A network as claimed in claim 3 wherein the means for insuring includes means for providing time slots of equal multiple bit duration with a frame alignment field.

6. A network as claimed in claim 3 wherein the means for insuring includes an elastic buffer to control and equalize the propagation length.

7. A communications network for handling data, voice or other delay sensitive messages comprising a plurality of stations or nodes, each station connected to a plurality of rings to allow communication between the stations using any of said rings, characterized by:
    means for allocating a maximum number of message slots to each station connected to the rings dependent on traffic requirements to ensure delay sensitive messages are transmitted without undue delay, means for routing message blocks to an available ring for transmission to a downstream station, means for inhibiting transmission of further blocks from a station if its allocation has been used, means for passing interrogating information along each available ring to determine whether a further allocation of message slots can be provided, wherein the means for passing is initiated to pass interrogating information each time an empty message slot is available at any station, and wherein a reallocation procedure is instigated if the interrogating information returns from a passage throughout the ring without modification.

8. A network as claimed in claim 7, characterized in that the message slots are staggered from one ring relative to another to ensure no two message slots arrive simultaneously at any station.

9. A network as claimed in claim 8 characterized in that a common clock provides timing signals for all the rings and their associated stations.

10. A network as claimed in claim 8 characterized in that all the rings are substantially the same length and introduce substantially equal delays.

11. A network as claimed in claim 7 characterised in that a number of stations may be connected to a multiplexed link in addition to the rings to allow an additional message path.

12. A network as claimed in claim 7 including means for decrementing the remaining allocation of message slots each time a packet is released onto any ring.

13. A network as claimed in claim 12 wherein the means for decrementing includes a counter associated with each ring at a station, each counter being decremented whenever a packet is sent onto any ring.

14. A method of operating a communications network comprising a number of stations connected to a plurality of message rings, said method characterized by:
    allocating a maximum number of message slots to each station dependent on traffic requirements to ensure delay sensitive messages are transmitted without undue delay; routing message blocks at any station to an available ring for transmission to a downstream station, inhibiting transmission of further blocks from a station if its allocation has been used, and interrogating each available ring to determine whether a further allocation of message slots can be provided, said interrogating being effected on each available ring whenever an empty message slot is available at any station, and a reallocation procedure is instigated if the interrogating information returns from passage throughout the ring without modification.

15. A method as claimed in claim 14 including decrementing the remaining allocation of message slots each time a packet is released from that station onto any ring.

16. A method as claimed in claim 14 wherein a station reallocation can be effected automatically if reallocation via a ring is not received within a predetermined period.

17. A method as claimed in claim 14, 15 or 16 wherein the allocation can be modified dependent on changes in traffic conditions.

18. A communications network suitable for the transmission of synchronous services such as voice, and also data packets, comprising:
a plurality of nodes each connected to at least two rings to allow transmission to occur in the same direction around each ring, characterized by:
control means for controlling the maximum access delay experienced by packets belonging to the synchronous services and selector means for allowing any synchronous connection to utilize the first available ring for the transmission of each of its packets, wherein the control means includes a reallocation device at each node for independently seeking reallocation to all nodes of the right to transmit a number of packets.

19. A network as claimed in claim 18, wherein said control means is configured to control the number of packets which can be allocated for transmission from any node without inhibition, to any of the rings to which it is connected.

20. A network as claimed in claim 18, further including means for insuring that packets transmitted on different rings are received in the same order as that of the transmitted sequence.

21. A network as claimed in claim 20 wherein the means for insuring includes a master clock configuration with staggered time slots relative to the rings to maintain sufficiently well defined and unambiguous time order for the slots, 22. A network as claimed in claim 20, wherein the means for insuring includes means for providing time slots of equal multiple bit duration with a frame alignment field.

23. A network as claimed in claim 20, wherein the means includes an elastic buffer to control and equalize the propagation length.

24. A communications network suitable for the transmission of synchronous services such as voice, and also data packets, comprising:
a plurality of nodes each connected to at least two rings to allow transmission to occur in the same direction around each ring, characterized by:
control means for controlling the maximum access delay experienced by packets belonging to the synchronous services and selector means coupled to said control means for determining the packet at a node experiencing the longest access delay and for selecting the packet experiencing the longest access delay for transmission, and means for allowing any synchronous connection to utilize the first available ring for the transmission of each of its packets.

25. A network as claimed in claim 24, characterized by the control means being configured to control the number of packets which can be allocated for transmission from any node without inhibition to any of the rings to which it is connected.

26. A network as claimed in claim 24, characterized in that the control means includes a reallocation device at each node for independently seeking reallocation to all nodes of the right to transmit a number of packets.

* * * * *